United States Patent
Aokage

(10) Patent No.: US 8,081,829 B2
(45) Date of Patent: Dec. 20, 2011

(54) MOTION ESTIMATION APPARATUS AND CONTROL METHOD THEREOF

(75) Inventor: Hironori Aokage, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1002 days.

(21) Appl. No.: 12/018,288

(22) Filed: Jan. 23, 2008

(65) Prior Publication Data

US 2008/0181517 A1     Jul. 31, 2008

(30) Foreign Application Priority Data

Jan. 25, 2007   (JP) ................. 2007-015375

(51) Int. Cl.
*G06K 9/36* (2006.01)
*G06K 9/46* (2006.01)
(52) U.S. Cl. ...................................... 382/238
(58) Field of Classification Search ................ None
See application file for complete search history.

(56) References Cited

U.S. PATENT DOCUMENTS

| | | | |
|---|---|---|---|
| 4,884,136 A | 11/1989 | Ninomiya et al. | |
| 4,941,045 A | 7/1990 | Birch | |
| 5,442,404 A | 8/1995 | Hong | |
| 6,795,123 B2 * | 9/2004 | Gotanda et al. | 348/448 |
| 7,075,580 B2 * | 7/2006 | Jiang | 348/448 |
| 7,126,643 B2 * | 10/2006 | Song et al. | 348/448 |
| 7,170,562 B2 * | 1/2007 | Yoo et al. | 348/452 |
| 7,233,363 B2 * | 6/2007 | Song | 348/448 |
| 7,405,768 B2 * | 7/2008 | Tanaka | 348/452 |
| 7,750,974 B2 * | 7/2010 | MacInnis et al. | 348/448 |
| 2003/0112369 A1 * | 6/2003 | Yoo et al. | 348/448 |
| 2004/0119884 A1 * | 6/2004 | Jiang | 348/448 |
| 2004/0135926 A1 * | 7/2004 | Song et al. | 348/448 |
| 2004/0233326 A1 * | 11/2004 | Yoo et al. | 348/452 |
| 2004/0257466 A1 * | 12/2004 | Song | 348/448 |

FOREIGN PATENT DOCUMENTS

| | | |
|---|---|---|
| JP | 2006-041619 | 2/2006 |
| KR | 10-2004-0099560 A | 12/2004 |
| WO | 02/37847 A1 | 5/2002 |

OTHER PUBLICATIONS

The above references were cited in a Jul. 26, 2011 European Search Report, a copy of which is enclosed, that issued in a corresponding European Patent Application No. 08001354.3.

* cited by examiner

*Primary Examiner* — Yuzhen Ge
(74) *Attorney, Agent, or Firm* — Cowan, Liebowitz & Latman, P.C.

(57) ABSTRACT

The present invention enables highly accurate estimation of a motion amount of a target pixel for motion-estimation located between two adjacent lines in a current field when generating a non-interlaced video signal from an interlaced video signal. To achieve this aim, an inter-field motion-estimating unit estimates a motion amount between a current field and a previous field. An intra-field motion-estimating unit estimates a motion amount within a current field. A motion amount calculation unit calculates a final motion amount based on the inter-field motion amount estimated by the inter-field motion-estimating unit and the intra-field motion amount estimated by the intra-field motion-estimating unit, and then outputs the motion amount.

7 Claims, 10 Drawing Sheets

MOTION ESTIMATION APPARATUS AND CONTROL METHOD THEREOF

BACKGROUND OF THE INVENTION

1. Field of the Invention

The present invention relates to a technique for estimating the motion amount of an interlaced video signal.

2. Description of the Related Art

Currently, typical video signal processing apparatuses handle interlace-scanned image signals.

Flicker commonly occurs in horizontal edge portions of an interlace-scanned image. As a means for addressing this problem, a technique is known in which interpolation is performed on interlace scan lines so as to generate and output a progressive-scan image signal.

Also, a technique is known in which, when converting into progressive scanning, the motion amount of an image is estimated, and the signal of a previous field and that of a current field are combined according to the result of the motion estimation to generate an interpolation signal. According to this technique, the condition of the interpolation signal varies according to the accuracy of the result of the motion estimation.

For example, if interpolation is performed with the image signal of a current field for a still area, narrow horizontal stripes disappear, causing a flicker. Conversely, if interpolation is performed with the image signal of a previous field for a moving area, a motion blur occurs, causing combing noise.

A technique for increasing the accuracy of motion estimation results is disclosed in Japanese Patent Laid-Open No. 2006-41619. According to this document, a pixel is selected from the upper and lower lines located above and below a pixel for interpolation. Using the differences between calculated results of these pixels and a pixel located in the same position as the pixel for interpolation in a previous field as an inter-field difference value, motion estimation is performed.

However, as shown in FIG. 2, when the pixels from the upper and lower lines are calculated, the following problem remains. That is, the pixels of a vertical line positioned at a high frequency area such as on a horizontal edge are blurred as compared to those of the same area of the actual frame. More specifically, because motion estimation is performed using a difference in values between the computed result and the pixel located in the same position as the pixel for interpolation in the previous field, motion amount is likely to be determined even for a still area, and line flicker therefore occurs.

SUMMARY OF THE INVENTION

Having been conceived in light of the problem described above, it is an object of the present invention to provide a technique capable of generating a favorable interpolated image by estimating the motion amount of a video image with higher accuracy.

In order to solve the above problem, for example, a motion estimation apparatus according to the present invention includes the following configuration. More specifically, a motion estimation apparatus that estimates a motion amount of a target pixel for motion-estimation located between two adjacent lines in a current field when generating a non-interlaced video signal from an interlaced video signal, the apparatus comprising:

a determination unit that calculates a difference in values between values of two pixels located on the two lines sandwiching the target pixel for motion-estimation in the current field, and compares the calculated difference value with a predetermined threshold to determine whether or not a horizontal edge is present between the two pixels;

a first calculation unit that calculates an average value of the values of the two pixels as a first temporary interpolated pixel value;

a second calculation unit that compares difference values between a value of a pixel located in the same position as the target pixel for motion-estimation in a previous field and each of the values of the two pixels in the current field, and determines the pixel having a smaller difference from among the two pixels to be a second temporary interpolated pixel value;

a selector that selects either of the first temporary interpolated pixel value and the second temporary interpolated pixel value as a temporary interpolated pixel value based on the result of the determination unit; and a motion amount calculation unit that calculates the motion amount of the target pixel for motion-estimation based on the temporary interpolated pixel value selected by the selector, the value of the pixel located in the same position as the target pixel for motion-estimation in the previous field, and the difference value of the two pixels.

According to the present invention, it is possible to achieve highly accurate estimation of the motion amount of a target pixel for motion estimation between two adjacent lines in a current field when generating a non-interlaced video signal from an interlaced video signal. Furthermore, by using this estimation result, a favorable non-interlaced video signal can be generated.

Further features of the present invention will become apparent from the following description of exemplary embodiments with reference to the attached drawings.

DESCRIPTION OF THE EMBODIMENTS

Hereinafter, embodiments of the present invention shall be described in detail with reference to the accompanying drawings.

First Embodiment

Figure 1:
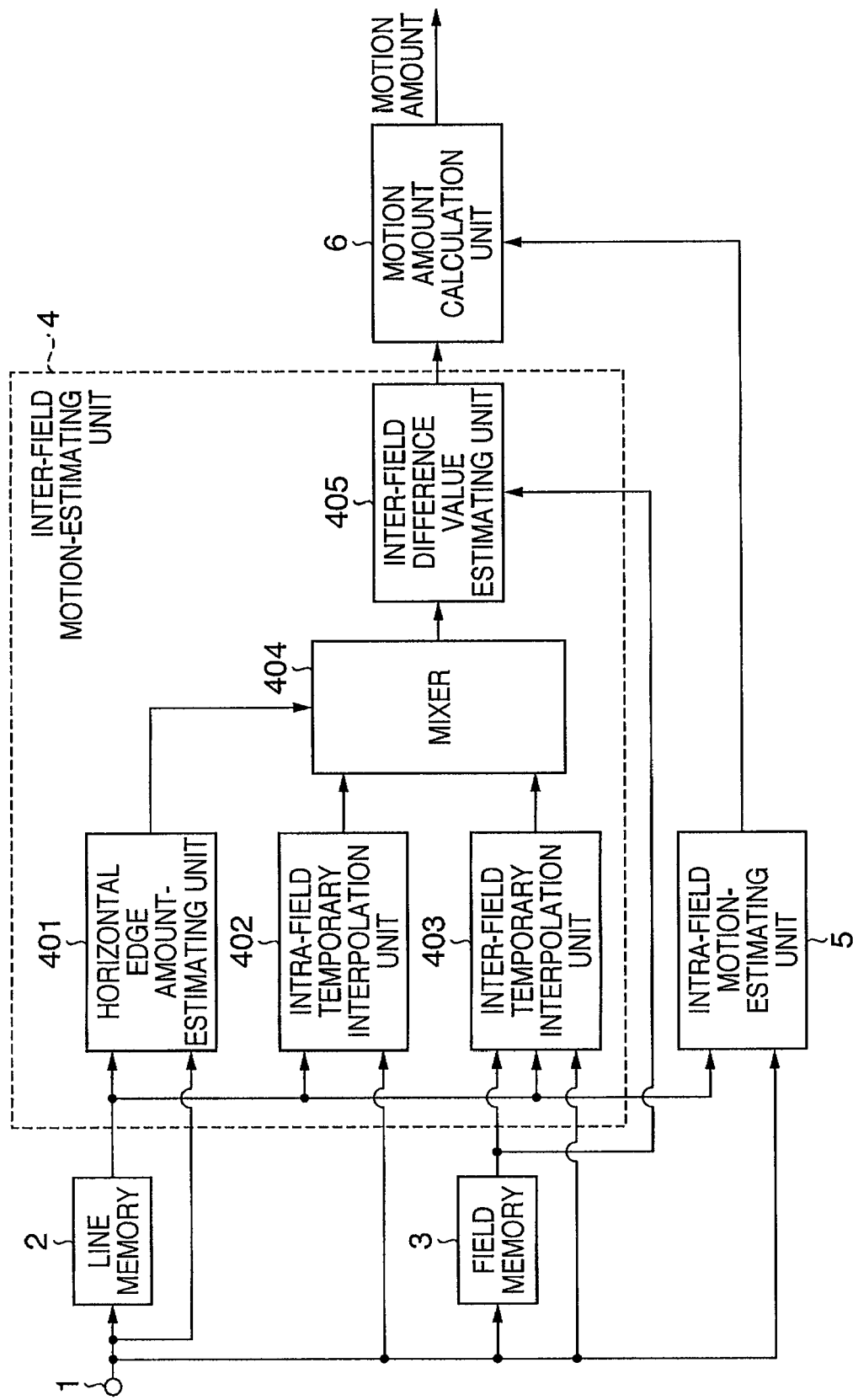
FIG. 1 is a block diagram showing the configuration of a motion estimation apparatus according to the first Embodiment.
Figure 2:
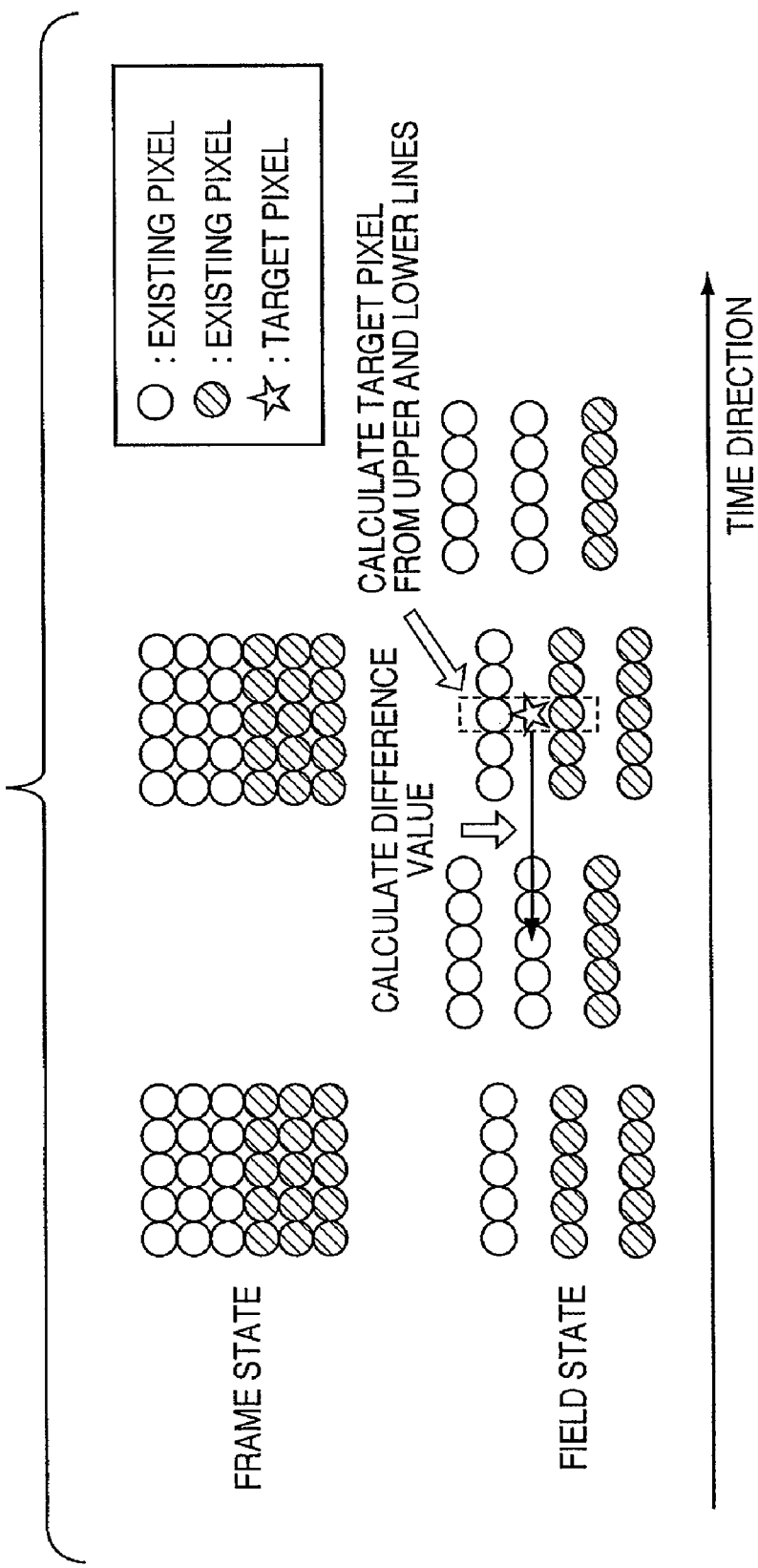
FIG. 2 is a diagram used to illustrate the principle of conventional estimation of an inter-field motion amount.

FIG. 1 is a block diagram showing an example of a motion estimation apparatus according to the first embodiment. For the sake of simplicity, an example is described in which the target to be processed is the luminance signal of a video signal, but it should be understood that the present invention is not limited thereto.

The motion estimation apparatus shown in FIG. 1 includes an input terminal 1, a line memory 2, a field memory 3, an inter-field motion-estimating unit 4, an intra-field motion-estimating unit 5, and a motion amount calculation unit 6.

The input terminal 1 inputs an interlaced video signal. The line memory 2 has a capacity for storing one line's worth of the interlaced signal is inputted by the input terminal 1. The field memory 3 has a capacity for storing one field's worth of the interlaced signal is inputted by the input terminal 1. The inter-field motion-estimating unit 4 estimates a motion amount between a current field and a previous field. The intra-field motion-estimating unit 5 estimates a motion amount within a current field. The motion amount calculation unit 6 calculates a final motion amount based on the inter-field motion amount estimated by the inter-field motion-estimating unit 4 and the intra-field motion amount estimated by the intra-field motion-estimating unit 5, and then outputs the motion amount.

The overall process of this apparatus configured as described above is as follows.

An interlaced video signal (in this embodiment, a luminance signal having no color component is used for the sake of simplicity) inputted by the input terminal 1 is supplied to the line memory 2, the field memory 3, the inter-field motion-estimating unit 4, and the intra-field motion-estimating unit 5. The line memory 2 delays the inputted signal by an amount of time equivalent to a single line, and outputs the delayed signal to the inter-field motion-estimating unit 4. Similarly, the field memory 3 delays the inputted signal by an amount of time equivalent to a single field, and outputs the delayed signal to the inter-field motion-estimating unit 4 and the intra-field motion-estimating unit 5. The inter-field motion-estimating unit 4 estimates a motion amount using inter-field information, and outputs the resultant to the motion amount calculation unit 6. The intra-field motion-estimating unit 5 estimates a motion amount using intra-field information, and outputs the resultant to the motion amount calculation unit 6. The motion amount calculation unit 6 determines a motion amount based on the ratio of the two inputted signals, and outputs the motion amount.

The operation of the motion estimation process of the motion estimation apparatus configured as described above shall be described in further detail.

A field image inputted by the input terminal 1 is stored in the line memory 2. The line memory 2 is configured of a FIFO memory that stores a single line's worth of data, and thus the data outputted from the line memory 2 is delayed by a single line. The inputted field image is also stored in the field memory 3. The field memory 3 has a single field's worth of memory capacity, and thus the field image outputted from the field memory 3 is delayed by an amount of time equivalent to a single field.

For simplicity's sake, the present embodiment assumes that the field image is a current field, and the image delayed by an amount of time equivalent to a single field is a previous field. It is furthermore assumed that the inputted signal belongs to a line positioned next below the line in which a target pixel for motion-estimation is present, and the signal delayed by an amount of time equivalent to a single line belongs to a line positioned next above the line in which the target pixel for motion-estimation is present.

The inter-field motion-estimating unit 4 receives an input of the image signals of the lines located above and below a target pixel for motion-estimation, and an input of the signals of a current field image and a previous field image, estimates an inter-field motion amount, and then outputs the result.

The intra-field motion-estimating unit 5 receives an input of the image signals of the upper and lower lines located above and below the line in which the target pixel for motion-estimation is present, estimates an intra-field motion amount, and then outputs the resultant. The motion amount calculation unit 6 receives an input of the intra-field motion amount and the inter-field motion amount, calculates the ratio of the intra-field motion amount and the inter-field motion to determine a motion amount, and then outputs the result.

Next, the inter-field motion-estimating unit 4 of this embodiment shall be described in further detail.

As shown in FIG. 1, the inter-field motion-estimating unit 4 includes a horizontal edge amount estimating unit 401, an intra-field temporary interpolation unit 402, an inter-field temporary interpolation unit 403, a mixer 404, and an inter-field difference value estimating unit 405.

The horizontal edge amount estimating unit 401 calculates a horizontal edge amount, and outputs the resultant to the mixer 404. The intra-field temporary interpolation unit 402 provisionally calculates the pixel value of the target pixel for motion-estimation based on intra-field information, and outputs the resultant to the mixer 404. The inter-field temporary interpolation unit 403 provisionally calculates the pixel value for the target pixel for motion-estimation based on inter-field information, and outputs the resultant to the mixer 404. The mixer 404 mixes the intra-field temporary interpolated value with the inter-field temporary interpolated value according to the horizontal edge amount, and outputs the resulting mixed signal to the inter-field difference value estimating unit 405. The inter-field difference value estimating unit 405 calculates an inter-field difference value, and outputs the resultant to the motion amount calculation unit 6. A more detailed description of each processing unit is given below.

The horizontal edge amount estimating unit 401 calculates the absolute difference in values between the inputted pixels of the upper and lower lines located above and below the target line for motion-estimation, and outputs the resulting absolute value of the difference to the mixer 404 as a horizontal edge amount.

The intra-field temporary interpolation unit 402 receives an input of the pixels of the upper and lower lines located above and below the target pixel for motion-estimation, calculates the average value thereof to obtain a temporary interpolated value, and outputs the result.

The inter-field temporary interpolation unit 403 receives an input of the pixel values of the upper and lower lines located above and below the target pixel for motion-estimation, and an input of the pixel value of the target pixel in the previous field. Then, the inter-field temporary interpolation unit 403 calculates the absolute difference in values between the pixel of the upper line located above the target pixel for motion-estimation and the pixel located in the same position as the target pixel for motion-estimation in the previous field. Furthermore, the inter-field temporary interpolation unit 403 also calculates the absolute difference in values between the pixel of the lower line located below the target pixel for motion-estimation and the pixel located in the same position as the target pixel for motion-estimation in the previous field. Then, the inter-field temporary interpolation unit 403 outputs either one of the pixels of the upper and lower lines as a temporary interpolated value based on the correlation between the calculated absolute difference values.

The mixer 404 outputs, based on the output from the horizontal edge amount estimating unit 401, one of the outputs of the intra-field temporary interpolation unit 402 and the inter-field temporary interpolation unit 403 to the inter-field difference value estimating unit 405 as a temporary interpolated value.

The inter-field difference value estimating unit 405 calculates the absolute difference in values between the output from the mixer 404 and the target pixel for motion-estimation in the previous field as an inter-field difference value, and then outputs the resultant to the motion amount calculation unit 6.

Figure 3:
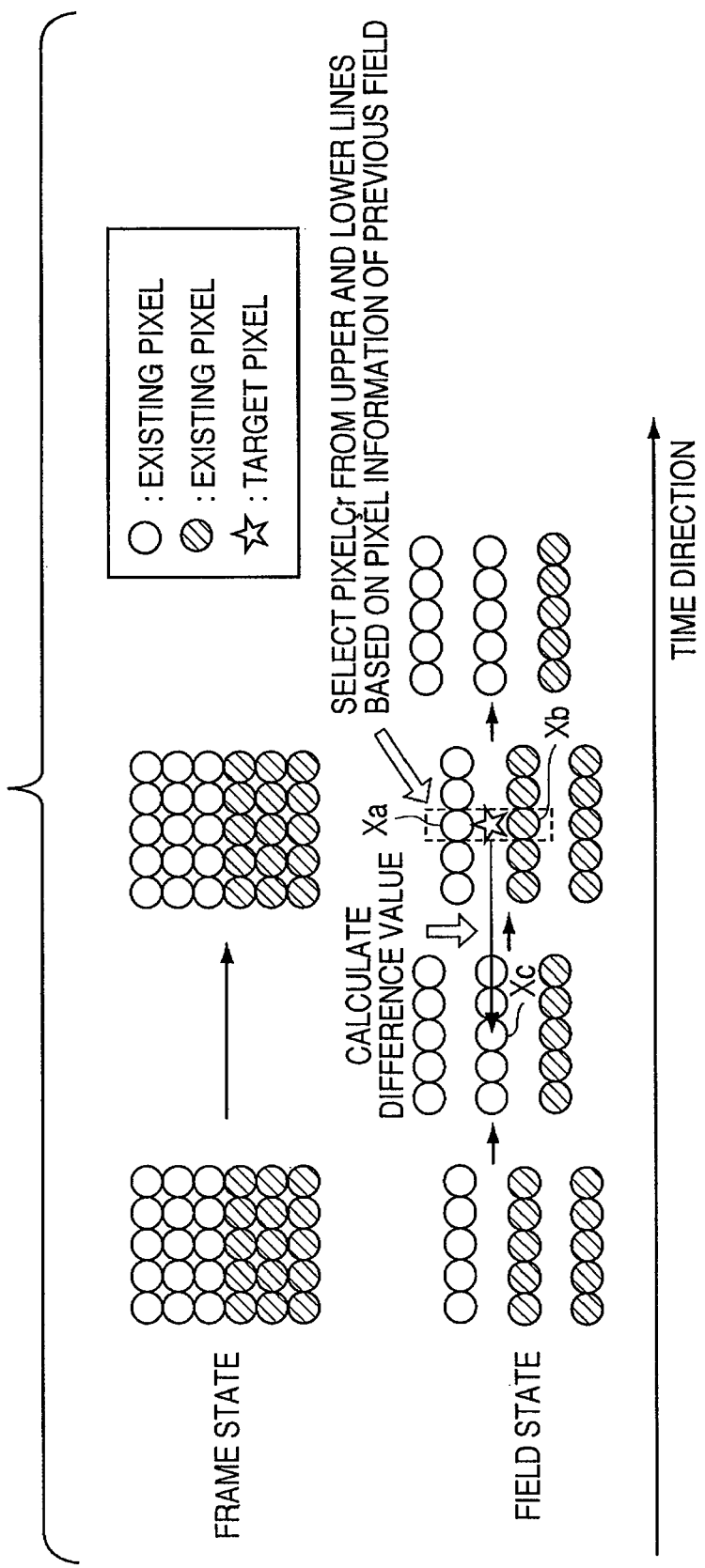
FIG. 3 is a diagram used to illustrate the principle of motion estimation according to the first embodiment.

The operation of the inter-field motion estimation process performed by the inter-field motion-estimating unit 4 configured as above shall be described in detail. FIG. 3 is a diagram illustrating a state of pixels used by the inter-field motion-estimating unit 4. A pixel located on a line next above the target pixel for motion-estimation (star-shaped mark) in the current field is expressed by Xa (the output from the line memory 2). A pixel located on a horizontal line next below the target pixel for motion-estimation is expressed by Xb. The pixel located in the same position as the target pixel for motion-estimation in the previous field is expressed by Xc.

In FIG. 1, the input terminal 1 inputs a video signal of an interlaced input signal. The horizontal edge amount estimating unit 401 calculates an absolute value of the difference |Xa−Xb| (|v| indicates the absolute value of v) between the pixel Xb contained in a video signal outputted directly from the input terminal 1 and the pixel Xa contained in the video signal one line previous outputted from the line memory 2, and outputs the resultant to the mixer 404.

The intra-field temporary interpolation unit 402 calculates the average value "(Xa+Xb)/2" of the pixels Xa and Xb, and outputs the resultant to the mixer 404.

The inter-field temporary interpolation unit 403 calculates an absolute value of the difference |Xa−Xc| between the pixel Xa and the pixel Xc that has been delayed by an amount of time equivalent to a single field by the field memory 3, and an absolute value of the difference |Xb−Xc| between the pixel Xb and the pixel Xc, and compares |Xa−Xc| with |Xb−Xc|. If |Xa−Xc|>|Xb−Xc|, the inter-field temporary interpolation unit 403 outputs the pixel Xb having a smaller difference from the previous field as an inter-field temporary interpolated value. If |Xa−Xc|≦|Xb−Xc|, the inter-field temporary interpolation unit 403 outputs the pixel Xa having a smaller difference from the previous field as an inter-field temporary interpolated value.

Figure 5:
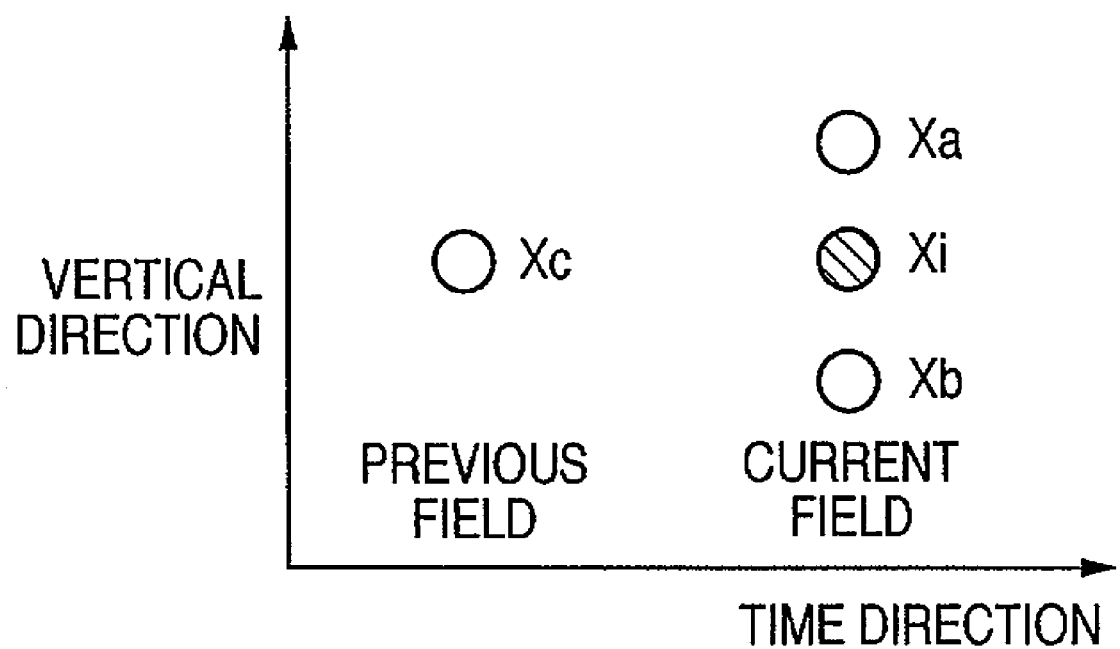
FIG. 5 is a diagram illustrating the relative positional relation between a pixel for interpolation and a pixel to be referred to according to the first Embodiment.

The mixer 404 outputs, based on the output from the horizontal edge amount estimating unit 401, either one of the outputs of the intra-field temporary interpolation unit 402 and the inter-field temporary interpolation unit 403 to the inter-field difference value estimating unit 405. To describe more specifically, as shown in FIG. 5, based on pixels Xa and Xb located above and below a pixel for interpolation Xi in the current field, and a pixel Xc located in the same position as the pixel Xi in the previous field, the mixer 404 determines the temporary interpolated value of the pixel for interpolation Xi. Then, the mixer 404 outputs the determined temporary interpolated value to the inter-field difference value estimating unit 405. A detailed description is given below. It should be noted that, in the following description, "h_edge_th" is a predetermined threshold for determining the presence or absence of a horizontal edge.

(1) If the output |Xa−Xb| from the horizontal edge amount estimating unit 401 is not greater than the threshold "h_edge_th", the mixer 404 calculates the output (Xa+Xb)/2 from the intra-field temporary interpolation unit 402, that is, the average value of the pixel values of the pixels located above and below the pixel for interpolation. Then, the mixer 404 outputs the calculated average value as the temporary interpolated value of the pixel for interpolation Xi.

(2) If the output |Xa−Xb| from the horizontal edge amount estimating unit 401 exceeds the threshold "h_edge_th", the mixer 404 outputs the output (Xa or Xb) from the inter-field temporary interpolation unit 403 as the temporary interpolated value of the pixel for interpolation Xi.

The inter-field difference value estimating unit 405 calculates an absolute difference in values between the temporary interpolated pixel value from the mixer 404 and the value of the pixel Xc located in the same position as the pixel for interpolation Xi in the previous field, and outputs the resultant to the motion amount calculation unit 6.

Figure 6:
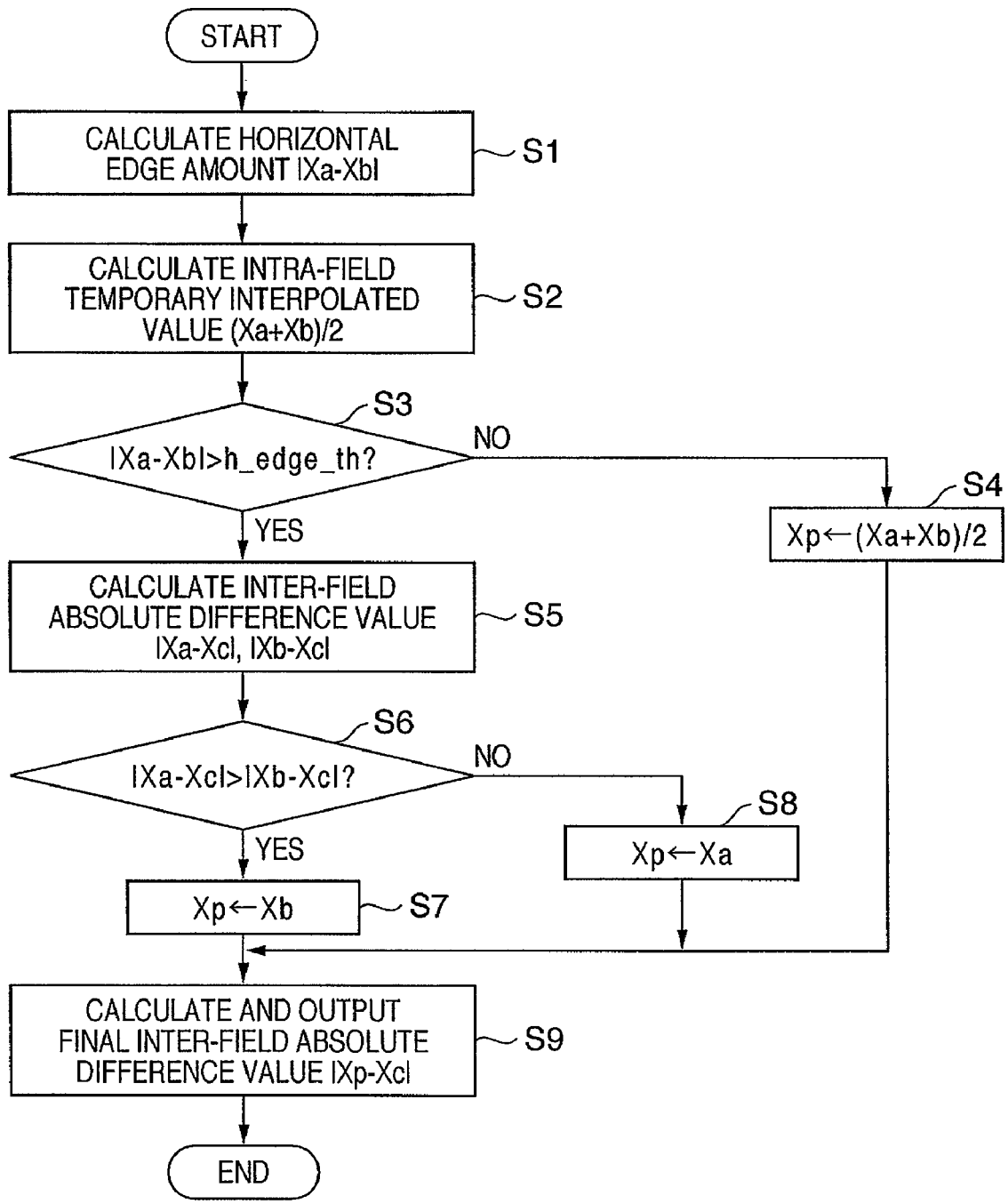
FIG. 6 is a flowchart used to illustrate the details of a process performed by an inter-field motion-estimating unit according to the first embodiment.

Although the foregoing has discussed the configuration and operation of the inter-field motion-estimating unit 4 according to the first embodiment, a further detailed description shall be given with reference to the flowchart of FIG. 6 for further clarification.

First, in step S1, the absolute difference in values between the pixels Xa and Xb is calculated to obtain a horizontal edge amount. The process of step S1 is performed by the horizontal edge amount estimating unit 401.

Then, in step S2, the average value (Xa+Xb)/2 of the pixels Xa and Xb is computed to obtain an intra-field temporary interpolated value. The process of step S2 is performed by the intra-field temporary interpolation unit 402.

In step S3, the absolute difference value |Xa−Xb| is compared with the threshold."h_edge_th". If |Xa−Xb|≦h_edge_th, or in other words, if it is determined that the difference between two pixels that are located above and below the pixel for interpolation and sandwich the pixel for interpolation in the current field is not greater than the threshold "h_edge_th", the process advances to step S4. In step S4, the average value (Xa+Xb)/2is determined as a temporary pixel value Xp for the pixel for interpolation Xi.

Furthermore, if it is determined in step S3 that |Xa−Xb|>h_edge_th, then, in step S5, an absolute value of the difference |Xa−Xc| between the values of the pixels Xa and Xc, and an absolute value of the difference |Xb−Xc| between the values of the pixels Xb and Xc are calculated. Then, in step S6, these two absolute difference values are compared. In other words, step S6 is a step of determining which of the pixels Xa and Xb is closer to the value of the pixel Xc located in the same position as the pixel for interpolation Xi in the previous field.

If it is determined that |Xa−Xc|>|Xb−Xc|, it indicates that the pixel Xb has a value closer to that of the pixel Xc, and therefore, in step S7, the value of the pixel Xb is determined as a temporary pixel value Xp for the pixel for interpolation Xi. If it is determined that |Xa−Xc|≦|Xb−Xc|, it indicates that the pixel Xa has a value closer to that of the pixel Xc, and therefore, in step S8, the value of the pixel Xa is determined as a temporary pixel value Xp for the pixel for interpolation Xi.

The steps S3 to S8 described above are performed by the inter-field temporary interpolation unit 403 together with the mixer 404.

Upon determination of the temporary pixel value Xp of the pixel for interpolation Xi in any one of the steps S4, S7 and S8 as described above, the process advances to step S9. The process of step S9 is performed by the inter-field difference value estimating unit 405, where the absolute difference in values between the temporary pixel value Xp of the pixel for interpolation Xi and the value of the pixel Xc located in the same position as the pixel for interpolation Xi in the previous field is calculated, and then outputted to the motion amount calculation unit 6.

Subsequently, the intra-field motion-estimating unit 5 and the motion amount calculation unit 6 shall be described.

The intra-field motion-estimating unit 5 calculates an absolute value of the difference |Xa−Xb| between two pixels Xa and Xb that are located above and below the pixel for interpolation Xi and sandwich the pixel for interpolation Xi in the current field, and outputs the absolute difference value to the motion amount calculation unit 6 as an intra-field motion amount. This intra-field motion-estimating unit 5 is identical to the horizontal edge amount estimating unit 401, and it is therefore also possible to supply, instead of the output of the intra-field motion-estimating unit 5, the output of the horizontal edge amount estimating unit 401 to the motion amount calculation unit 6.

The motion amount calculation unit 6 performs a calculation using the equation m=e/(e+f) to obtain a final motion amount m. In the equation, e expresses the inter-field difference value outputted from the inter-field difference value estimating unit 405, and f expresses the intra-field motion amount outputted from the intra-field motion-estimating unit 5.

As described above, according to this embodiment, when determining a temporary interpolated value for a target pixel for motion-estimation, which is a preliminary preparation for calculating an interfiled difference to obtain a motion amount, whether or not the target pixel for motion-estimation is present on a horizontal edge is determined. If the target pixel for motion-estimation is not present on a horizontal edge, in other words, if |Xa−Xb| is not greater than a threshold, the average value of the pixels Xa and Xb is determined as a temporary interpolated value. Conversely, if the target pixel for motion-estimation is present on a horizontal edge, based on the information of the pixel located in the same position as the target pixel for motion-estimation in the previous field and the information of upper and lower lines located above and below the target pixel for motion-estimation, a temporary interpolated value is selected from those of the upper and lower pixels located above and below the target pixel for motion-estimation. Subsequently, a difference e between the value of the target pixel for motion-estimation thus obtained and the value of the pixel located in the same position as the target pixel for motion-estimation in the previous field is determined. After that, an intra-field motion amount f is determined. Finally, the ratio of e to "e+f" is obtained as motion information for each pixel. Consequently, it is possible to estimate a motion amount for each pixel with high accuracy. Therefore, by using this, it is possible to perform mode determination when coding a moving image, and accurate extraction of a moving target from an image.

For the sake of simplicity, the first embodiment has been described in the context of using the luminance signal of a video signal, but the video signal may be an original signal such as an RGB signal. Alternatively, a chrominance signal may be used.

The motion estimation apparatus, that is, an apparatus according to this embodiment, receives an input of an interlaced signal and processes a pixel for interpolation, and thus the motion estimation apparatus does not perform motion estimation while the lines present in a current field are being scanned.

Furthermore, the foregoing has described an example in which the line memory and the field memory are provided separately, but part of the field memory may be used as the line memory.

Furthermore, the foregoing has described in the context of using a 1:2 interlaced image, but the present invention is not limited thereto. It is apparent that the present invention is applicable to interlaced images having a ratio other than the above by adjusting the field temporary interpolation unit and the inter-field difference value estimating unit.

Second Embodiment

Next, the second embodiment shall be described. In this embodiment, an example is shown in which the configuration of the first embodiment described above is applied to a progressive scanning conversion apparatus.

Figure 4:
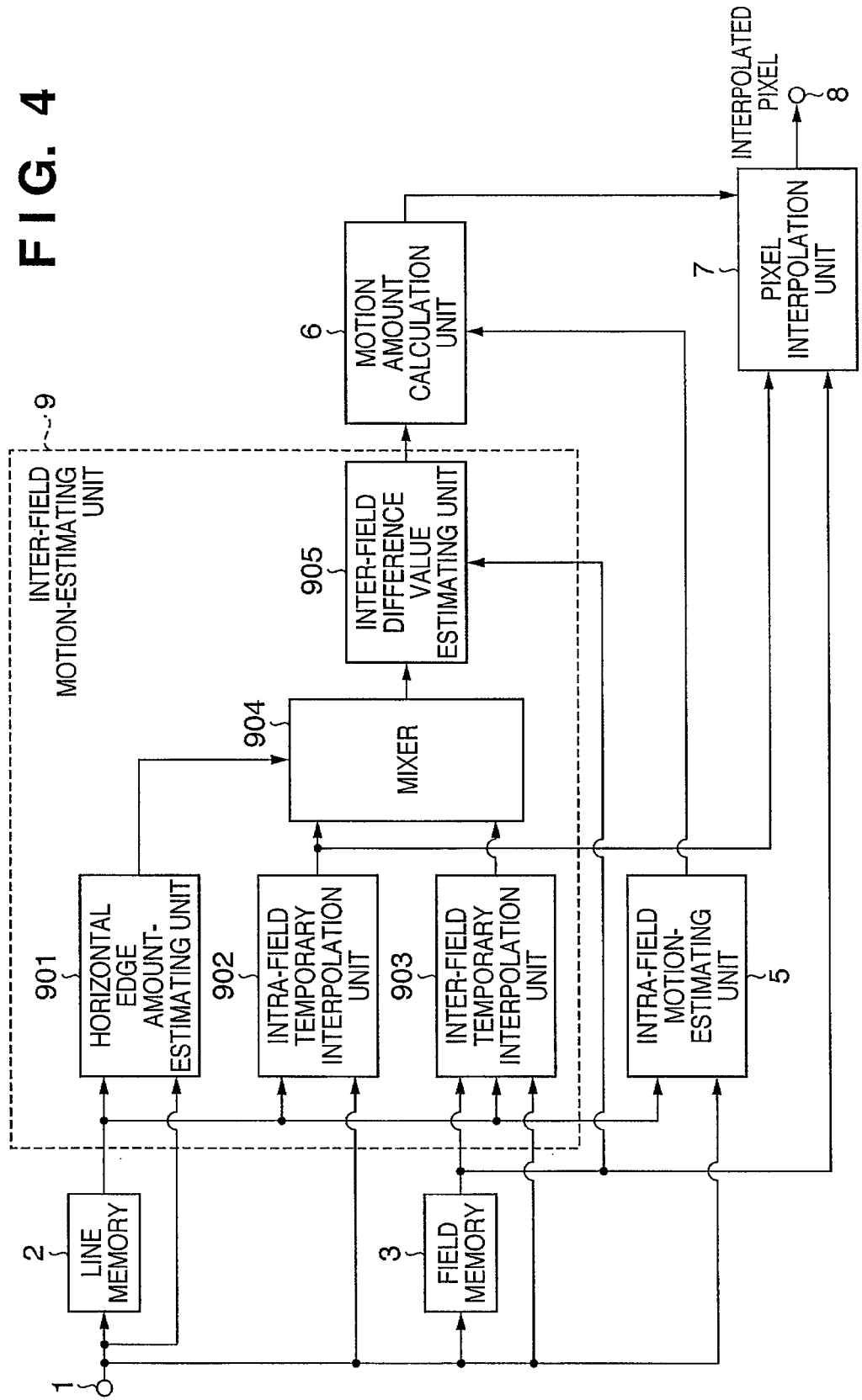
FIG. 4 is a block diagram showing the configuration of a progressive scanning apparatus according to the second embodiment.

FIG. 4 is a diagram showing the configuration of an apparatus according to the second embodiment. The differences between the configurations of FIGS. 4 and 1 are that a pixel interpolation unit 7 is added in FIG. 4, and the inter-field motion-estimating unit 4 of FIG. 1 is indicated by reference numeral 9 in FIG. 4. Accordingly, a horizontal edge amount estimating unit 901, an intra-field temporary interpolation unit 902, an inter-field temporary interpolation unit 903, a mixer 904, and an inter-field difference value estimating unit 905 are identical to the components 401 to 405 of FIG. 1, respectively, and thus their descriptions will be omitted.

The pixel interpolation unit 7 mixes the pixel Xc located in the same position as the pixel for interpolation Xi in the previous filed having been delayed by the field memory 3 by a single field with the temporary pixel value of the pixel for interpolation sent from the intra-field temporary interpolation unit 902, based on the output from the motion amount calculation unit 6. Then, the pixel interpolation unit 7 outputs the mixed result as a final interpolated pixel value. The output destination is a display device (non-interlaced display device), which is not shown in the diagram.

In this process, the pixel interpolation unit 7 performs the following calculation to determine a final interpolated pixel value Xg:

$$Xg = m \times Xd + (1-m) \times Xc.$$

Here, Xd expresses the temporary pixel value of the pixel for interpolation from the intra-field temporary interpolation unit 902, and m expresses the output from the motion amount calculation unit 6, which is obtained in the first embodiment. Note that m is a value not less than 0 and not greater than 1.

As described above, according to the second embodiment, interpolated values are calculated continuously using motion amounts calculated with high accuracy, whereby it is possible to reduce motion blur in moving areas and reduce line flicker in still areas.

Third Embodiment

The first and second embodiments described above may be implemented by a generic information processing apparatus, such as a personal computer, and a computer program that causes the information processing apparatus to execute the first and second embodiments. Such an example shall be described below as the third embodiment.

Figure 7:
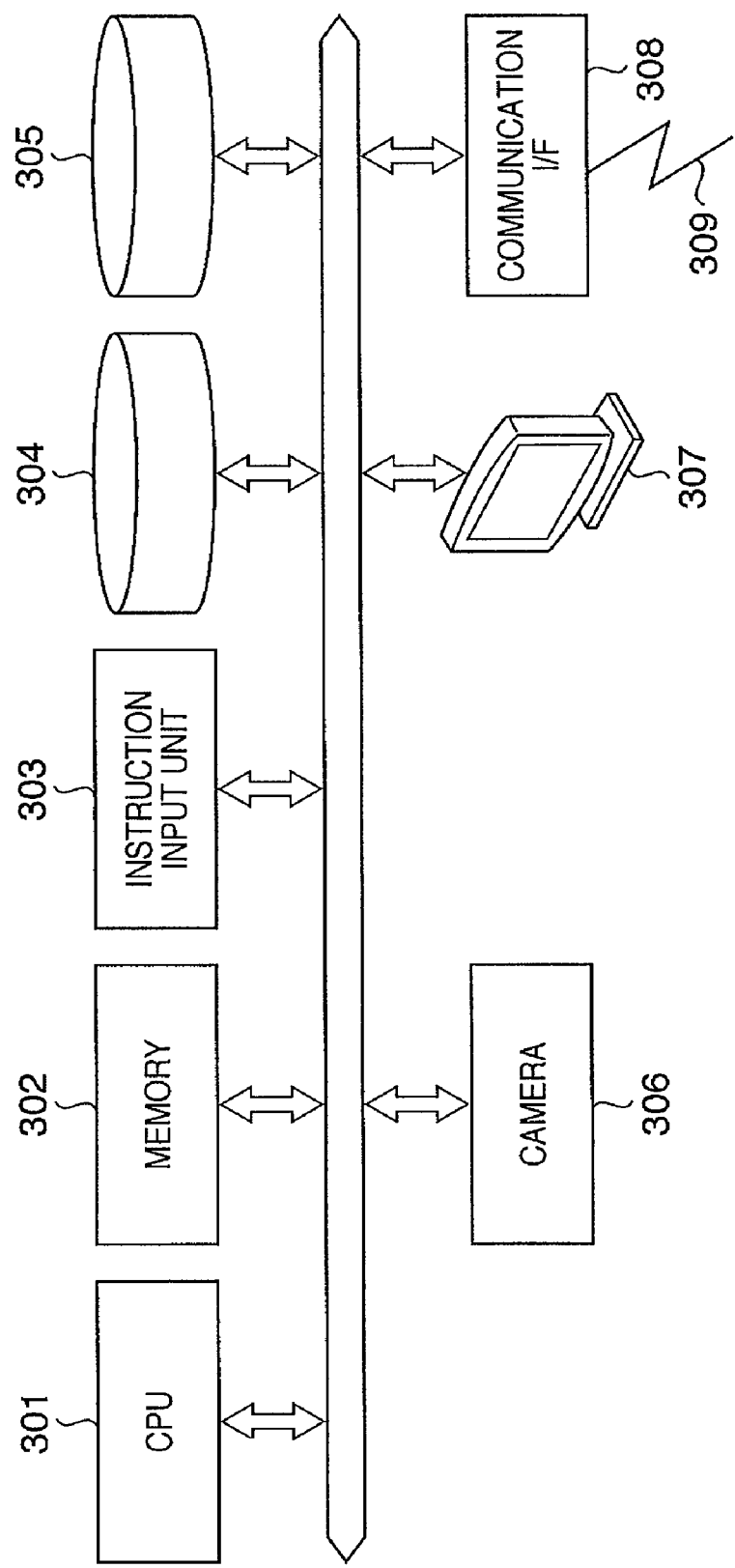
FIG. 7 is a block diagram showing the configuration of an information processing apparatus of the third embodiment.

FIG. 7 is a block diagram showing the configuration of an information processing apparatus according to the third embodiment.

In FIG. 7, reference numeral 301 denotes a central processing unit (hereinafter referred to as "CPU") that performs control of the entire apparatus and various processes. Reference numeral 302 denotes a memory configured of a ROM that stores a BIOS and a boot program, and a RAM serving as a work area for the CPU 301. Reference numeral 303 denotes an instruction input unit configured of a keyboard, a pointing device such as a mouse, and various switches. Reference numeral 304 denotes an external storage device (e.g., a hard disk drive) that provides an operating system (OS) necessary for controlling this apparatus of this embodiment, a computer program according to the third embodiment, and a storage area necessary for computation. Reference numeral 305 denotes a storage device that accesses portable storage media (e.g., DVD-ROMs and CD-ROM disks) that store moving image data. Reference numeral 306 denotes a video camera that captures moving images on a field-by-field basis. Reference numeral 307 denotes a monitor that displays progressive images. Reference numeral 309 denotes a communication line, which is configured of a LAN, public line, wireless line, device for broadcasting radio waves, or the like. Reference numeral 308 denotes a communication interface that transmits and receives encoded data through the communication line 309.

The image interpolation process performed using this configuration shall be described.

Figure 8:
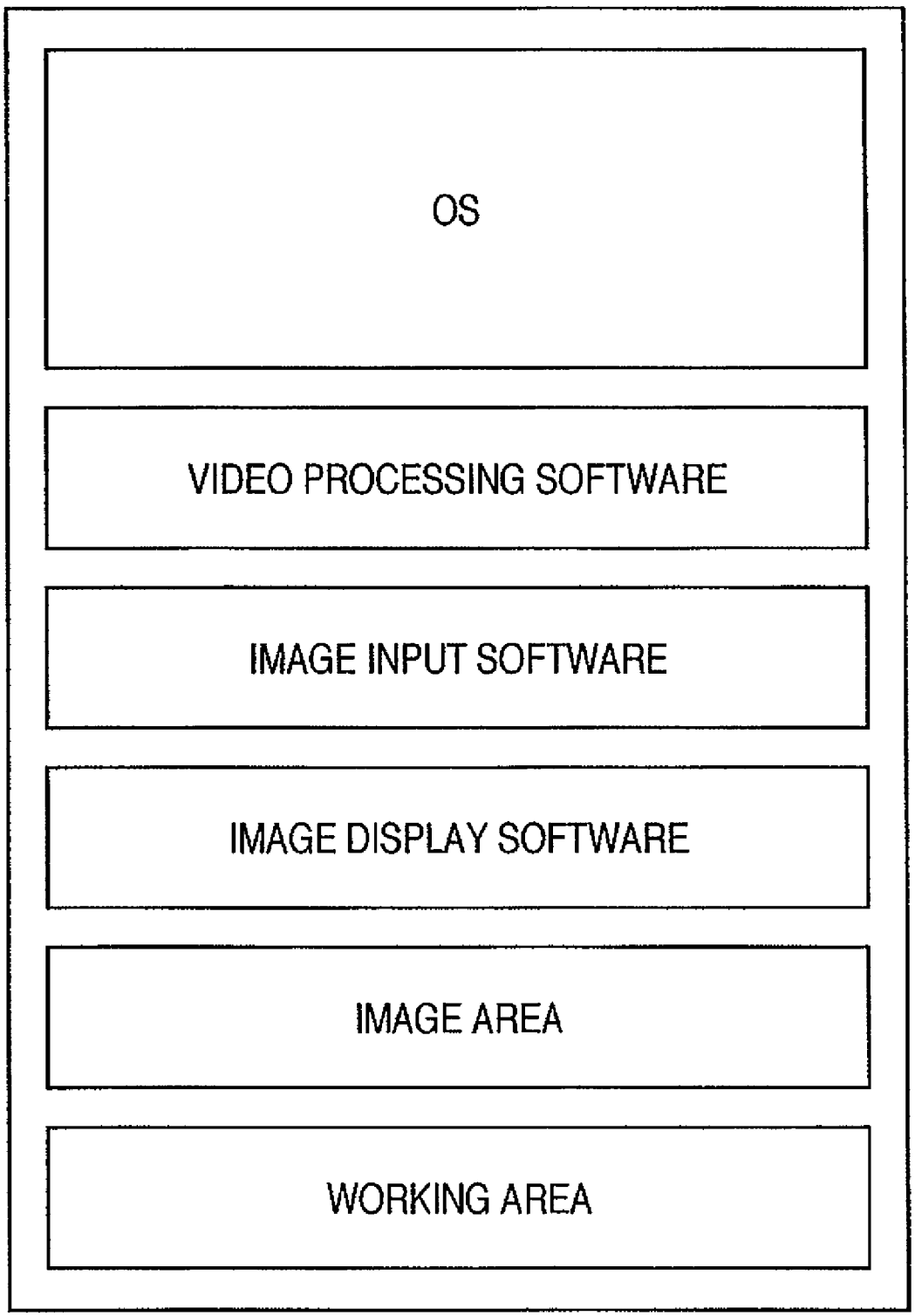
FIG. 8 is a diagram illustrating a storage state of a memory during processing according to the third embodiment.

Prior to the process, upon power-on of the apparatus through the instruction input unit 303, the CPU 301 loads the OS (operating system) from the external storage device 304 into the memory 302 (RAM) in accordance with the boot program (which is stored in the ROM) of the memory 302. Then, in accordance with an instruction from the user, an application program is loaded from the external storage device 304 into the memory 302. Thus, the apparatus of this embodiment functions as an image processing apparatus. FIG. 8 shows a storage state of the memory when this application program is loaded into the memory 302.

The memory 302 stores an OS for controlling the entire apparatus and operating various software, and video processing software that performs interpolation process for an image by calculating a motion amount. The memory 302 further stores image input software that inputs (captures) moving images as digital data on a field-by-field basis by controlling the camera 306, and image display software that displays images on the monitor 307. Furthermore, the memory 302 has an image area that stores image data, and a working area that stores various computation parameters and the like.

Figure 9:
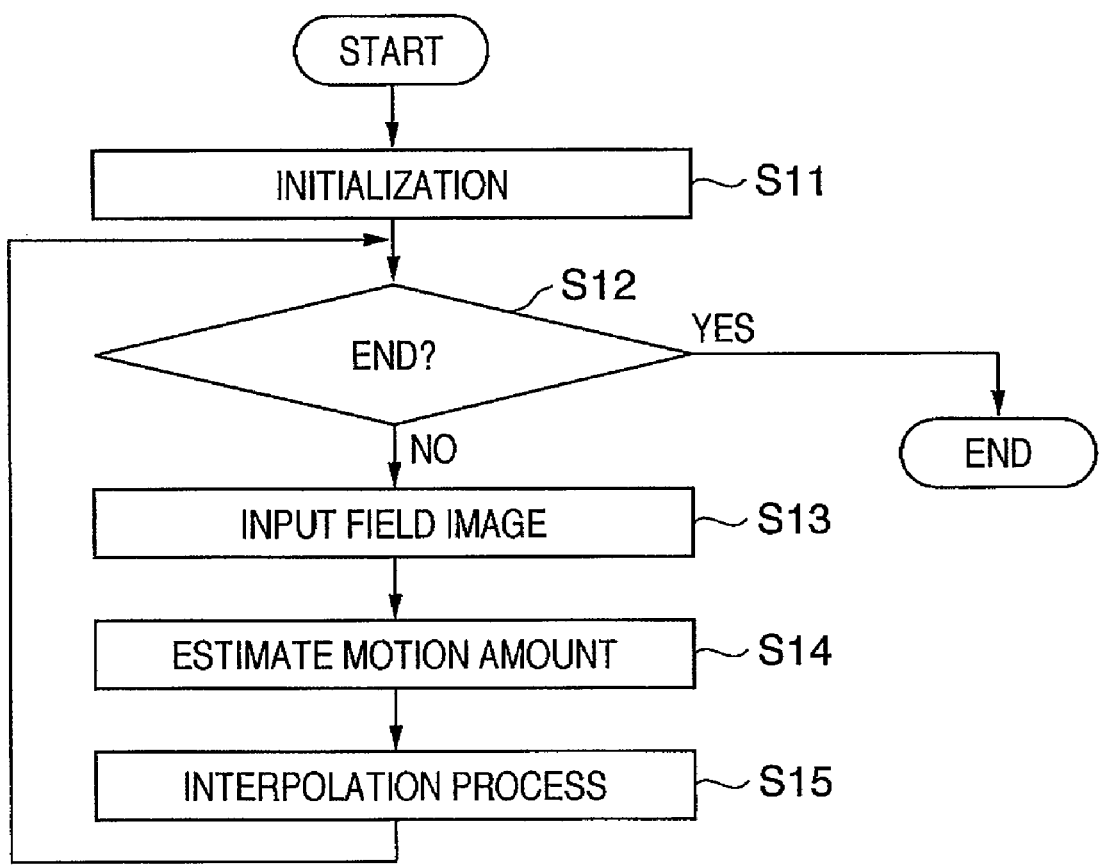
FIG. 9 is a flowchart illustrating the procedure of the image interpolation process according to the third embodiment.

FIG. 9 is a flowchart illustrating the image interpolation process performed by an application executed by the CPU 301.

In step S11, each unit is initialized. In step S12, it is determined as to whether or not to end the program. The termination is determined based on whether or not an instruction to end has been inputted by the user through the instruction input unit 303.

In step S13, images are inputted on a field-by-field basis. In step S14, the motion amount is estimated. In step S15, an interpolation process is performed for pixels, and then the process goes back to step S12.

Figure 10:
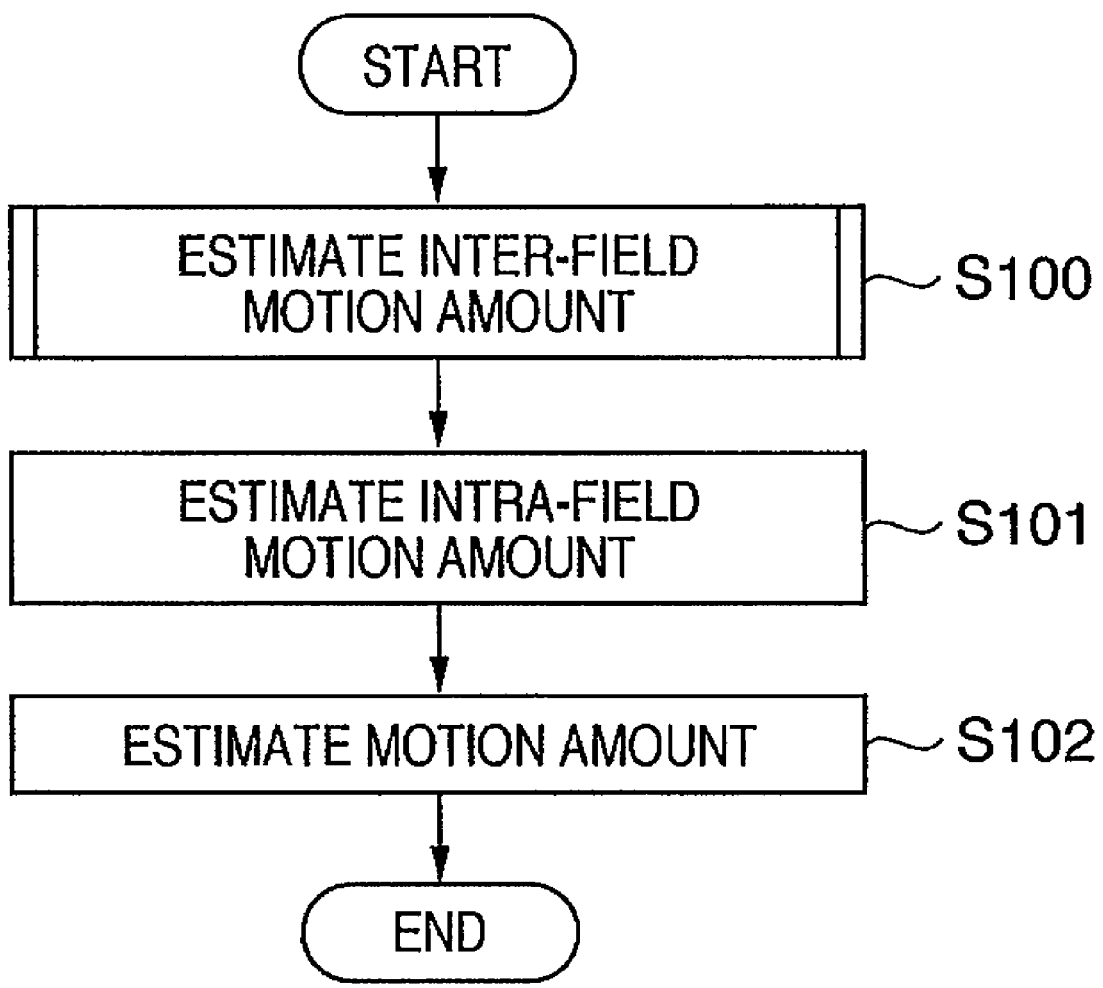
FIG. 10 is a flowchart illustrating the process of the motion estimation step of FIG. 9.

Next, the process of the motion estimation of S14 shall be shown in the flowchart of FIG. 10.

In step S100, an inter-field motion amount is estimated. The details of this estimation have been described with reference to FIG. 6. In step S101, an intra-field motion amount is estimated. Then, in step S102, the inter-field motion amount and the intra-field motion amount are mixed to obtain a final motion amount. After this step, the process goes back to step S15 of FIG. 9.

As described above, according to the third embodiment, interpolated values are calculated continuously using motion amounts calculated with high accuracy, whereby it is possible to achieve, by means of software, a reduction of motion blur in moving areas and a reduction of line flicker in still areas.

Normally, computer programs are stored in computer-readable storage media such as CD-ROMs, and can be executed by inserting a CD-ROM into a reader (CD-ROM drive) of a computer, and then copying or installing the computer program into the system. Accordingly, it is apparent that such computer readable storage media fall within the scope of the present invention.

As described above, according to this embodiment, a motion amount is estimated by performing temporary interpolation for a target pixel for motion-estimation in a state identical to the actual frame, and estimating a motion amount based on a difference in values between that result and the pixel located in the same position as the pixel for interpolation in the previous field. Therefore, accuracy for estimating a motion amount for a pixel located on a horizontal edge can be improved while the image is apparently still, and line flicker in interpolated images can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-015375, filed on Jan. 25, 2007, which is hereby incorporated by reference herein in its entirety.

What is claimed is:

1. A motion estimation apparatus that estimates a motion amount of a target pixel for motion-estimation located between two adjacent lines in a current field when generating a non-interlaced video signal from an interlaced video signal, the apparatus comprising:
a determination unit that calculates a difference in values between values of two pixels located on the two lines sandwiching the target pixel for motion-estimation in the current field, and compares the calculated difference value with a predetermined threshold to determine whether or not a horizontal edge is present between the two pixels;
a first calculation unit that calculates an average value of the values of the two pixels as a first temporary interpolated pixel value;
a second calculation unit that compares difference values between a value of a pixel located in the same position as the target pixel for motion-estimation in a previous field and each of the values of the two pixels in the current field, and determines the pixel having a smaller difference from among the two pixels to be a second temporary interpolated pixel value;
a selector that selects either of the first temporary interpolated pixel value and the second temporary interpolated pixel value as a temporary interpolated pixel value based on the result of the determination unit; and
a motion amount calculation unit that calculates the motion amount of the target pixel for motion-estimation based on the temporary interpolated pixel value selected by the selector, the value of the pixel located in the same position as the target pixel for motion-estimation in the previous field, and the difference value of the two pixels.

2. The motion estimation apparatus according to claim 1, wherein the motion amount calculation unit comprises:
a first computation unit that computes an absolute value of difference e between the temporary interpolated pixel value selected by the selector and the value of the pixel located in the same position as the target pixel for motion-estimation in the previous field; and
a second computation unit that calculates $e/(e+f)$, where the difference value of the two pixels is expressed by f, and outputs the resulting value as the motion amount of the target pixel for motion-estimation.

3. The motion estimation apparatus according to claim 1, further comprising an interpolated pixel output unit that calculates g=m×d+(1−m)×c, where m expresses the motion amount calculated by the motion amount calculation unit, c expresses the value of the pixel located in the same position as the target pixel for motion-estimation in the previous field, d expresses the average value, and g expresses a pixel value of the target pixel for motion-estimation to be outputted, and outputs the pixel value g.

4. A method for controlling a motion estimation apparatus that estimates a motion amount of a target pixel for motion-estimation located between two adjacent lines in a current field when generating a non-interlaced video signal from an interlaced video signal, the method comprising the steps of:
   a determination step of calculating a difference in values between values of two pixels located on the two lines sandwiching the target pixel for motion-estimation in the current field, and compares the calculated difference value with a predetermined threshold to determine whether or not a horizontal edge is present between the two pixels;
   a first calculation step of calculating an average value of the values of the two pixels as a first temporary interpolated pixel value;
   a second calculation step of comparing difference values between a value of a pixel located in the same position as the target pixel for motion-estimation in a previous field and each of the values of the two pixels in the current field, and determines the pixel having a smaller difference from among the two pixels to be a second temporary interpolated pixel value;
   a selection step of selecting either of the first temporary interpolated pixel value and the second temporary interpolated pixel value as a temporary interpolated pixel value based on the result of the determination step; and
   a motion amount calculation step of calculating the motion amount of the target pixel for motion-estimation based on the temporary interpolated pixel value selected by the selection step, the value of the pixel located in the same position as the target pixel for motion-estimation in the previous field, and the difference value of the two pixels.

5. The method for controlling a motion estimation apparatus according to claim 4, wherein the motion amount calculation step comprises the steps of:
   a first computation step of computing an absolute value of difference e between the temporary interpolated pixel value selected by the selection step and the value of the pixel located in the same position as the target pixel for motion-estimation in the previous field; and
   a second computation step of calculating e/(e+f), where the difference value of the two pixels is expressed by f, and outputting the resulting value as the motion amount of the target pixel for motion-estimation.

6. The method for controlling a motion estimation apparatus according to claim 4, further comprising an interpolated pixel output step of calculating g=m×d+(1−m)×c, where m expresses the motion amount calculated by the motion amount calculation step, c expresses the value of the pixel located in the same position as the target pixel for motion-estimation in the previous field, d expresses the average value, and g expresses a pixel value of the target pixel for motion-estimation to be outputted, and outputting the pixel value g.

7. A non-transitory computer-readable storage medium that stores a program that causes a computer to execute the method for controlling a motion estimation apparatus according to claim 4.

* * * * *